No. 651,071. Patented June 5, 1900.
R. I. FANCHER.
APPARATUS FOR SCALDING FRUITS OR VEGETABLES.
(Application filed Nov. 9, 1899.)
(No Model.)
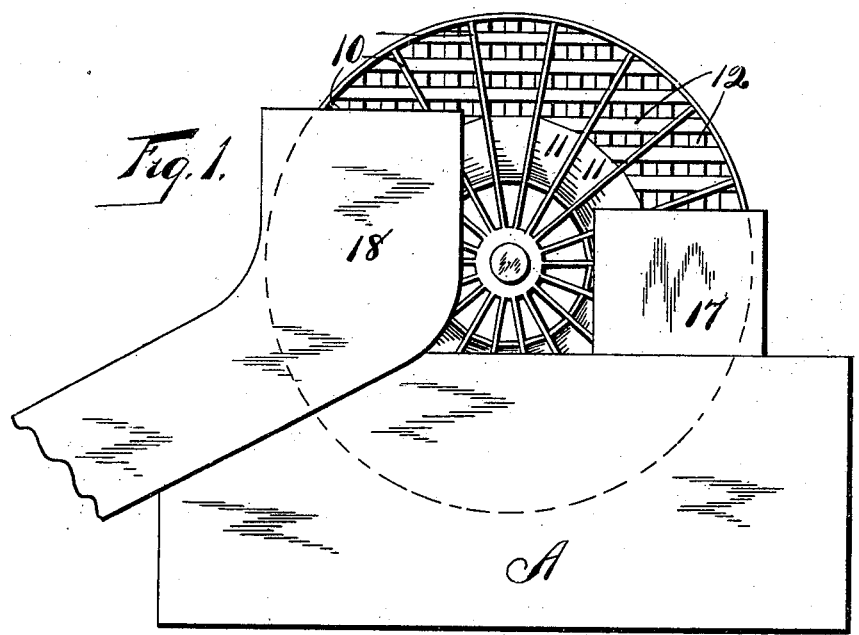
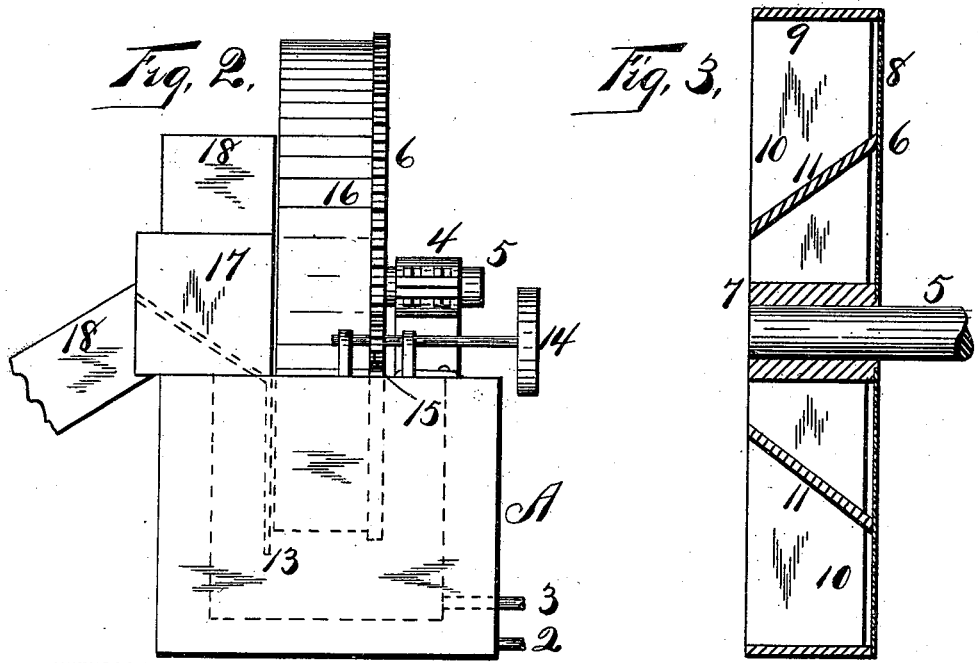
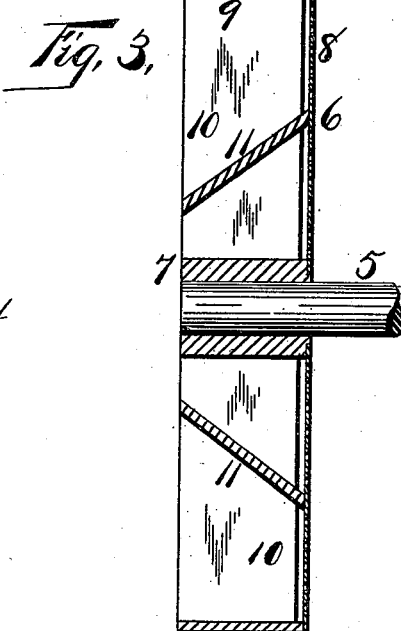
WITNESSES:
C. A. Schoeneck
M. M. Nott
INVENTOR
Rosman I. Fancher
BY
Smith & Davidson
ATTORNEYS.

UNITED STATES PATENT OFFICE.

ROSMAN I. FANCHER, OF BALDWINSVILLE, NEW YORK.

APPARATUS FOR SCALDING FRUITS OR VEGETABLES.

SPECIFICATION forming part of Letters Patent No. 651,071, dated June 5, 1900.

Application filed November 9, 1899. Serial No. 736,373. (No model.)

*To all whom it may concern:*

Be it known that I, ROSMAN I. FANCHER, of Baldwinsville, in the county of Onondaga, in the State of New York, have invented new and useful Improvements in Canning Machinery, of which the following, taken in connection with the accompanying drawings, is a full, clear, and exact description.

My invention relates to canning machinery, and particularly to devices and appliances used in the preparation of fruits or vegetables for canning.

My object is to produce an improved apparatus for scalding fruits or vegetables which are peeled or from which the skins are removed.

It consists in a rotatable wheel having radial pockets, which are successively immersed for a given period in boiling water, said pockets being open on one side to permit the fruit to be filled into them by means of a suitable spout or hopper, and in providing on the opposite side a discharge-chute receiving the fruit when it is scalded, as it is, and by its own gravity emptied from the pockets successively. Suitable means, as a steam-jacketed tank or one heated by the direct admission of steam, are provided for effecting the scalding. Also, suitable means are provided for rotating said holder at a suitable rate of speed to insure proper scalding without cooking of the fruit therein.

The drawings herein illustrate my apparatus, reference being also had to the accompanying specification.

Figure 1 is a front elevation, Fig. 2 is a side elevation, and Fig. 3 is a vertical section, of the fruit-holder.

A is the tank, which can be constructed with a jacket, as indicated by the dotted lines in Fig. 2, and heated by steam let in by the pipe 2, or without a jacket and having the steam fed directly into the water, as through the pipe 3. In other words, the water in the tank can be heated by any suitable means. A pillar 4, erected upon the tank, carries a shaft 5 in a suitable bearing, and 6 is the fruit-holder, secured upon said shaft, comprising a hub 7, a back 8, a rim 9, radial or other partitions 10, and inclined transverse partitions 11, constituting the inner ends of the pockets 12. The back and rim are preferably made of a suitable netting for freer circulation of the water or other scalding agent. The top of the tank is usually covered, excepting a slotway which receives the holder. A vertical retainer 13 is secured to one edge of this slot in such manner as to retain the fruit in the pockets while being scalded. (See dotted lines in Fig. 2.) A shaft and pulley 14 drive a pinion 15, which engages with a rack 16 on the holder to revolve said holder. Upon the front of the tank a feed-hopper 17 is erected, whereby the fruit is fed into the descending pockets successively. At the opposite side a discharge-chute 18 is erected in proper position to receive the fruit as it automatically slides out or discharges itself from the rising pockets successively, the inclined inner ends of the pockets facilitating this discharge.

It will be seen that the pockets or buckets are successively filled, immersed in the hot water or other bath, carrying through it the fruit retained therein, and successively emptied as the pockets leave the bath.

Having described my invention, what I claim, and desire to secure by Letters Patent, is—

1. The tank for holding hot water, an operating-shaft mounted thereon, a feed-hopper also mounted thereon, means bearing against the open side of the fruit-holder to prevent the fruit from falling out when being scalded, and a discharge-chute, combined with the revolving fruit-holder which is operated by the driving-shaft and which is closed upon one side and open upon the other, a series of radial partitions, and inclined transverse partitions forming the bottoms of the chambers formed in the fruit-holder by the radial ones, whereby the fruit after being dipped in the liquid is automatically emptied into the discharge-chute, substantially as shown and described.

2. The fruit-holder provided with a hub and suitable bearings, whereby the holder is adapted to revolve, and means for causing the holder to revolve, combined with radial partitions placed in the holder, a back applied to one side of the holder, a vertical retainer placed against the side of the holder to prevent the fruit from falling out while being scalded and the inclined partitions 11, substantially as set forth.

In witness whereof I have hereunto set my hand this 3d day of November, 1899.

ROSMAN I. FANCHER.

Witnesses:
MILDRED M. NOTT,
HOWARD P. DENISON.